US009331759B2

(12) United States Patent
He et al.

(10) Patent No.: US 9,331,759 B2
(45) Date of Patent: May 3, 2016

(54) HARQ TIMING DESIGN FOR A TDD SYSTEM

(71) Applicant: Intel IP Corporation, Santa Clara, CA (US)

(72) Inventors: Hong He, Beijing (CN); Jong-Kae Fwu, Sunnyvale, CA (US); Alexey Khoryaev, Nizhny Novgorod (RU); Seunghee Han, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 113 days.

(21) Appl. No.: 14/141,265

(22) Filed: Dec. 26, 2013

(65) Prior Publication Data

US 2014/0293842 A1  Oct. 2, 2014

Related U.S. Application Data

(60) Provisional application No. 61/806,821, filed on Mar. 29, 2013.

(51) Int. Cl.
*H04B 1/56* (2006.01)
*H04B 7/26* (2006.01)
(Continued)

(52) U.S. Cl.
CPC .............. *H04B 7/0456* (2013.01); *H04B 1/56* (2013.01); *H04B 7/0417* (2013.01); *H04L 1/1864* (2013.01); *H04L 5/0048* (2013.01); *H04L 5/0051* (2013.01); *H04L 5/0057* (2013.01); *H04L 5/0073* (2013.01); *H04L 5/0085* (2013.01); *H04W 24/00* (2013.01); *H04W 24/10* (2013.01); *H04W 36/0005* (2013.01); *H04W 36/22* (2013.01); *H04W 36/26* (2013.01);

(Continued)

(58) Field of Classification Search
CPC ...... H04B 1/56; H04B 7/2656; H04B 7/2643; H04W 80/04; H04W 88/06; H04W 28/04; H04W 72/04; H04W 72/0446; H04W 84/12; H04W 74/04
USPC .......................... 370/280, 328, 329, 336, 337
See application file for complete search history.

(56) References Cited

U.S. PATENT DOCUMENTS

2011/0205986 A1   8/2011  Medapalli
2012/0327821 A1  12/2012  Lin et al.
(Continued)

FOREIGN PATENT DOCUMENTS

WO   WO2012/128598 A2   9/2012
WO   WO2012/145907 A1  11/2012
(Continued)

OTHER PUBLICATIONS

ETSI, "Evolved Universal Terrestrial Radio Access (E-UTRA); Physical Layer Procedures," 3GPP TS 36.213 V11.2.0, Sophia Antipolis Cedex, France, Apr. 2013, 175 pages.
(Continued)

*Primary Examiner* — Ronald B Abelson
(74) *Attorney, Agent, or Firm* — Schwabe, Williamson & Wyatt, P.C.

(57) ABSTRACT

Disclosed are methods and apparatuses related to receiving one or more indications of time division duplex (TDD) uplink/downlink (UL/DL) configurations for two consecutive radio frames. Based on the indications of the TDD UL/DL configurations, a reference TDD UL/DL configuration may be identified for one or more Hybrid Automatic Repeat reQuest (HARQ) processes.

23 Claims, 5 Drawing Sheets

(51) Int. Cl.
| | |
|---|---|
| H04W 80/04 | (2009.01) |
| H04W 88/06 | (2009.01) |
| H04W 28/04 | (2009.01) |
| H04W 72/04 | (2009.01) |
| H04W 84/12 | (2009.01) |
| H04W 74/04 | (2009.01) |
| H04B 7/04 | (2006.01) |
| H04L 5/00 | (2006.01) |
| H04W 56/00 | (2009.01) |
| H04W 76/02 | (2009.01) |
| H04W 36/30 | (2009.01) |
| H04W 24/00 | (2009.01) |
| H04W 36/26 | (2009.01) |
| H04W 48/18 | (2009.01) |
| H04W 24/10 | (2009.01) |
| H04W 36/00 | (2009.01) |
| H04W 36/22 | (2009.01) |
| H04L 1/18 | (2006.01) |
| H04W 48/16 | (2009.01) |
| H04W 36/08 | (2009.01) |
| H04W 48/12 | (2009.01) |
| H04W 88/08 | (2009.01) |

(52) U.S. Cl.
CPC .............. *H04W36/30* (2013.01); *H04W 48/18*
(2013.01); *H04W 56/001* (2013.01); *H04W*
*76/023* (2013.01); *H04L 5/0007* (2013.01);
*H04W 36/08* (2013.01); *H04W 48/12* (2013.01);
*H04W 48/16* (2013.01); *H04W 88/08* (2013.01);
*Y02B 60/50* (2013.01)

(56) References Cited

U.S. PATENT DOCUMENTS

2013/0242819 A1   9/2013  He et al.
2013/0250772 A1*  9/2013  Yin ........................... H04L 5/16
                                                                    370/241
2014/0010128 A1   1/2014  He et al.

FOREIGN PATENT DOCUMENTS

| WO | WO2013/005991 A3 | 1/2013 | | |
| WO | WO 2013/066387 A1 | 5/2013 | | |
| WO | WO 2013/123751 | * 8/2013 | ................ | H04L 1/18 |
| WO | WO 2013/138019 A1 | 9/2013 | | |

OTHER PUBLICATIONS

International Search Report and Written Opinion mailed Aug. 13, 2014 from International Application No. PCT/US2014/031868.
ZTE, "HARQ timing in TDD-eIMTA," 3GPP TSG RAN WG1 Meeting #72, R1-130130, Agenda item: 7.3.3.3, Jan. 28-Feb. 1, 2013, St Julian's, Malta, 3 pages.
Samsung, "PUSCH HARQ timing on scheduled cell for Case D," 3GPP TSG-RAN WG1 Meeting #70, R1-123457, Agenda item: 7.2.3, Aug. 13-17, 2012, Qingdao, China, 5 pages.
Office Action issued Apr. 30, 2015 in Taiwan Application No. 103111466.
3GPP, "Technical Specification Group Radio Access Network; Evolved Universal Terrestrial Radio Access (E-UTRA); Multiplexing and channel coding (Release 8)," 3GPP TS 36.212 V8.3.0 (May 2008), Jun. 20, 2008, 48 pages.
3GPP, "Technical Specification Group Radio Access Network; Evolved Universal Terrestrial Radio Access (E-UTRA) Radio Resource Control (RRC); Protocol specification (Release 8)," 3GPP TS 36.331 V8.2.0 (May 2008), Jun. 9, 2008, 151 pages.

* cited by examiner

HARQ TIMING DESIGN FOR A TDD SYSTEM

CROSS REFERENCE TO RELATED APPLICATIONS

The present application claims priority to U.S. Provisional Patent Application No. 61/806,821, filed Mar. 29, 2013, entitled "ADVANCED WIRELESS COMMUNICATION SYSTEMS AND TECHNIQUES," the entire disclosure of which is hereby incorporated by reference.

FIELD

Embodiments of the present invention relate generally to the field of communications, and more particularly, to selection of acknowledgement timing in wireless communication networks.

BACKGROUND INFORMATION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In some versions of long term evolution (LTE) networks such as those defined by release 12 of the third generation partnership project (3GPP) specifications, a time division duplex (TDD) uplink/downlink (UL/DL) configuration may change between two consecutive radio frames. Specifically, a first TDD UL/DL configuration may be used for a first radio frame and a second TDD UL/DL configuration may be used for a second radio frame. This changing TDD UL/DL configuration may be referred to as a dynamic TDD UL/DL reconfiguration.

In some cases, the use of different TDD UL/DL configurations in consecutive radio frames may decrease throughput of the eNodeB (eNB) and/or user equipment (UE) of the radio cell. Specifically, the change in TDD UL/DL configurations may extend the length of time it takes to complete a Hybrid Automatic Repeat reQuest (HARQ) process in the cell, which may result in a transmission of less data within the radio cell. Additionally, in some cases it may be problematic for a UE to identify the change in TDD UL/DL configurations in the cell.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for selection of acknowledgement signal timing in a wireless communication network.

Embodiments include methods and apparatuses related to receiving by a user equipment (UE) one or more indications of time division duplex (TDD) uplink/downlink (UL/DL) configurations for two consecutive radio frames. For example, a first radio frame n may have a first TDD UL/DL configuration, and a second radio frame n+1 may have a second TDD UL/DL configuration. Based on the indications of the TDD UL/DL configurations, a reference TDD UL/DL configuration may be identified for one or more Hybrid Automatic Repeat reQuest (HARQ) processes.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
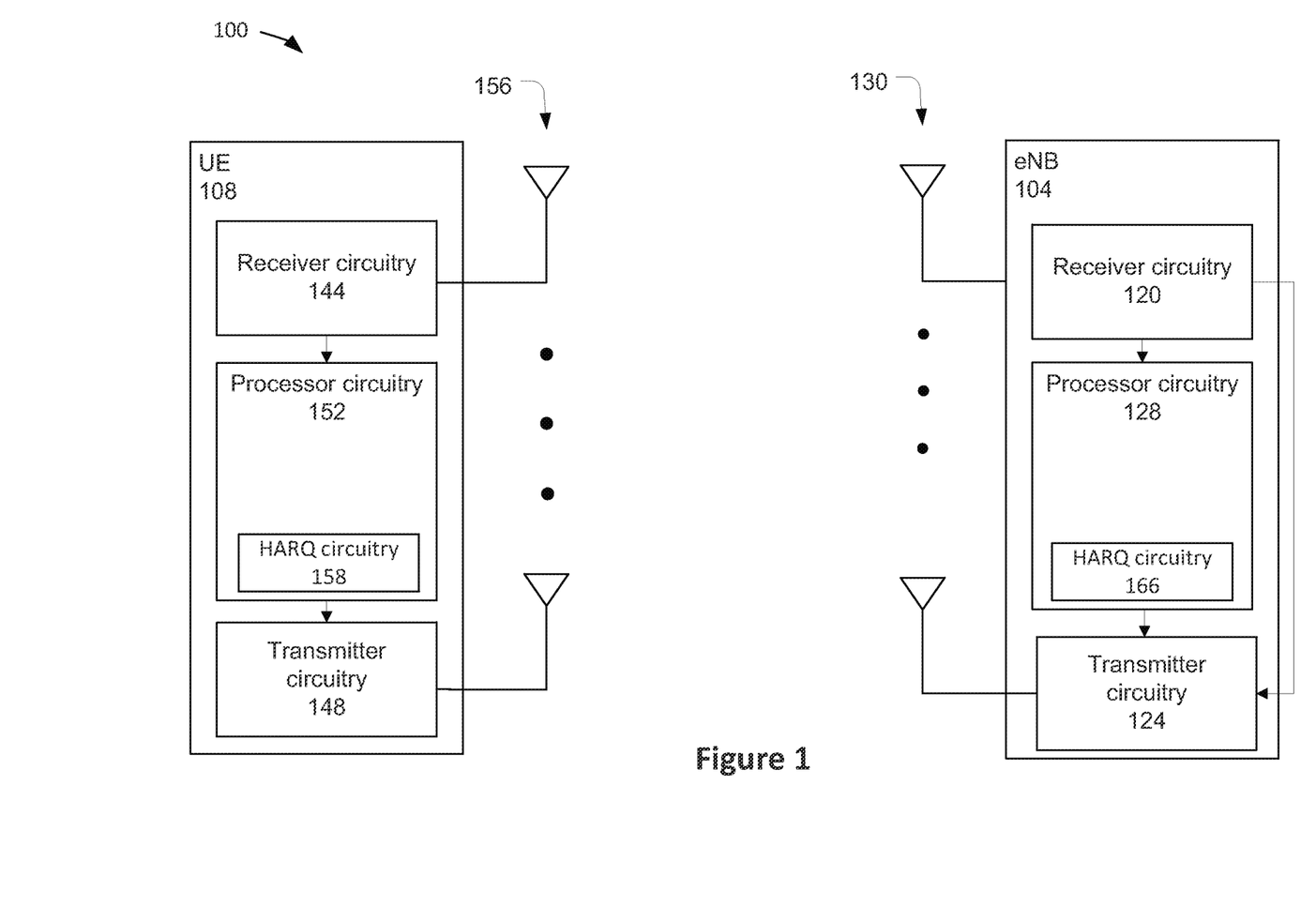
FIG. 1 schematically illustrates a wireless communication network, in accordance with various embodiments.

FIG. 1 schematically illustrates a wireless communication network 100 in accordance with various embodiments. Wireless communication network 100 (hereinafter "network 100") may be an access network of a third generation partnership project (3GPP) long-term evolution (LTE) or LTE-A network such as evolved universal mobile telecommunication system (UMTS) terrestrial radio access network (E-UTRAN). The network 100 may include a base station, e.g., E-UTRAN node base station (eNB) 104, configured to wirelessly communicate with a mobile device or terminal, e.g., user equipment (UE) 108. While embodiments of the present invention are described with reference to an LTE network, some embodiments may be used with other types of wireless access networks.

eNB 104 may include receiver circuitry 120 with which to receive signals from UE 108 via one or more antennas 130. eNB 104 may include transmitter circuitry 124 with which to transmit signals to UE 108 via one or more antennas 130. eNB 104 may also include processor circuitry 128 coupled between receiver circuitry 120 and transmitter circuitry 124 and configured to encode and decode information communicated by the signals. The eNB 104 may further include processor circuitry 128 which may be coupled with or otherwise include Hybrid Automatic Repeat reQuest (HARQ) circuitry 166, as will be discussed in greater detail below.

UE 108 may include receiver circuitry 144, transmitter circuitry 148, processor circuitry 152, and one or more suitable antennas 156. Receiver circuitry 144 and transmitter circuitry 148 may be coupled to one or more suitable antennas 156 to transmit and receive wireless signals to/from eNB 104.

Processor circuitry 152 may be coupled to receiver circuitry 144 and transmitter circuitry 148, and be configured to decode and encode information transmitted in signals communicated between the UE 108 and the eNB 104. Processor circuitry may include HARQ circuitry 158. Processor circuitry 152 may be configured to use the HARQ circuitry 158 to identify one or more TDD UL/DL configurations for one or more signals that are to be transmitted by transmitter circuitry 148 or received by receiver circuitry 144.

Specifically, the signals transmitted by the transmitter circuitry 148 or received by the receiver circuitry 144 may be transported according to one of several TDD UL/DL configurations. In some embodiments the TDD UL/DL configurations may be 3GPP LTE TDD UL/DL configurations 0-6 for TDD HARQ processes as defined, for example, in Table 4.2-2 of 3GPP TS 36.211 v11.4 (2013-09) shown in Table 1. In other embodiments, different TDD UL/DL configurations may be used.

With reference to Table 1, the UE 108 may be assigned to transport data and/or control signals according to one of several possible TDD UL/DL configurations. In general, each of subframes 0-9 that is labeled with a "D" or an "S" may be a subframe with which UE 108 receives data from eNB 104, and each of subframes 0-9 that is labeled with a "U" may be a subframe through which UE 108 transmits data to eNB 104.

TABLE 1

| TDD UL/DL configurations | | | | | | | | | | |
|---|---|---|---|---|---|---|---|---|---|---|
| TDD UL/DL configuration | Subframe number | | | | | | | | | |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

In some embodiments, the UE 108 may be configured to communicate data to the eNB 104, for example on the physical uplink shared channel (PUSCH). In response the eNB 104 may communicate an acknowledgement signal to the UE 108, for example through the physical hybrid adaptive repeat and request indicator channel (PHICH) or a physical downlink control channel (PDCCH). According to one embodiment, the acknowledgement signals may be HARQ signals corresponding to a positive acknowledgement (HARQ-ACK) of receipt of the data. In embodiments, the eNB 104 may be configured to transmit signals to notify the UE 108 that transmitted data has been received. Alternatively, in some embodiments, the eNB 104 may be configured to communicate data to the UE 108, for example on the physical downlink shared channel (PDSCH). In response the UE 108 may communicate a HARQ-ACK to the eNB 104 on the physical uplink control channel (PUCCH) or the PUSCH. In some embodiments a negative acknowledgement (HARQ-NACK) may be transmitted instead of a HARQ-ACK, and the HARQ-NACK message may indicate that the data has not been received correctly. The term HARQ-ACK will be generalized herein to refer to either the HARQ-ACK or the HARQ-NACK.

In some embodiments, the transmission of data, either from the eNB 104 or the UE 108, and/or the transmission of a HARQ-ACK signal may be performed according to the timing prescribed by one or more of the TDD UL/DL configurations depicted above in Table 1. In some embodiments, the eNB 104, and specifically the HARQ circuitry 166 of the eNB 104, may further be configured to determine the TDD UL/DL configuration with which data or a HARQ-ACK signal will be transmitted to, or received from, UE 108. In some embodiments, the eNB 104, and specifically the HARQ circuitry 166 of the eNB 104, may be configured to determine which TDD UL/DL configuration will be used for a given radio frame, and transmit indications of the TDD UL/DL configurations to the UE 108. In some embodiments, the indications of the TDD UL/DL configurations may be transmitted to the UE 108 in a control signal which may be referred to as downlink control information (DCI) message. In some embodiments, the DCI may be received in a DL subframe or a set of DL subframes within a radio frame according to the TDD UL/DL configuration indicated in a system information block (SIB) message. In some embodiments the SIB message indicating of DL subframe or a set of DL subframes conveying the DCI may be the system information block type 1 (SIB1) as described in the 3GPP LTE standards. The SIB1 may be broadcast by the eNB 104, and correspondingly received by the UE 108, on the PDSCH. The UE 108, and specifically the HARQ circuitry 158 of the UE 108, may be configured to identify the TDD UL/DL configurations indicated by the DCI message.

As described above, in some embodiments two different TDD UL/DL configurations may be used in different sequential radio frames of a radio cell. In some embodiments it may be useful for the eNB 104 to signal to the UE 108 when the TDD UL/DL configurations may change. By knowing when the TDD UL/DL configurations may change between radio frames, the UE 108 may then be able to change the timing of one or more data transmissions or HARQ-ACK signal transmissions from the UE 108. In some embodiments, the TDD UL/DL configuration within a given radio frame may be indicated by a common DCI format on a common search space (CSS) of the PDCCH or aUE specific search space (USS) of enhanced PDCCH (ePDCCH) or PDCCH in one or more predetermined DL subframes, or a physical broadcast channel (PBCH).

Figure 2:
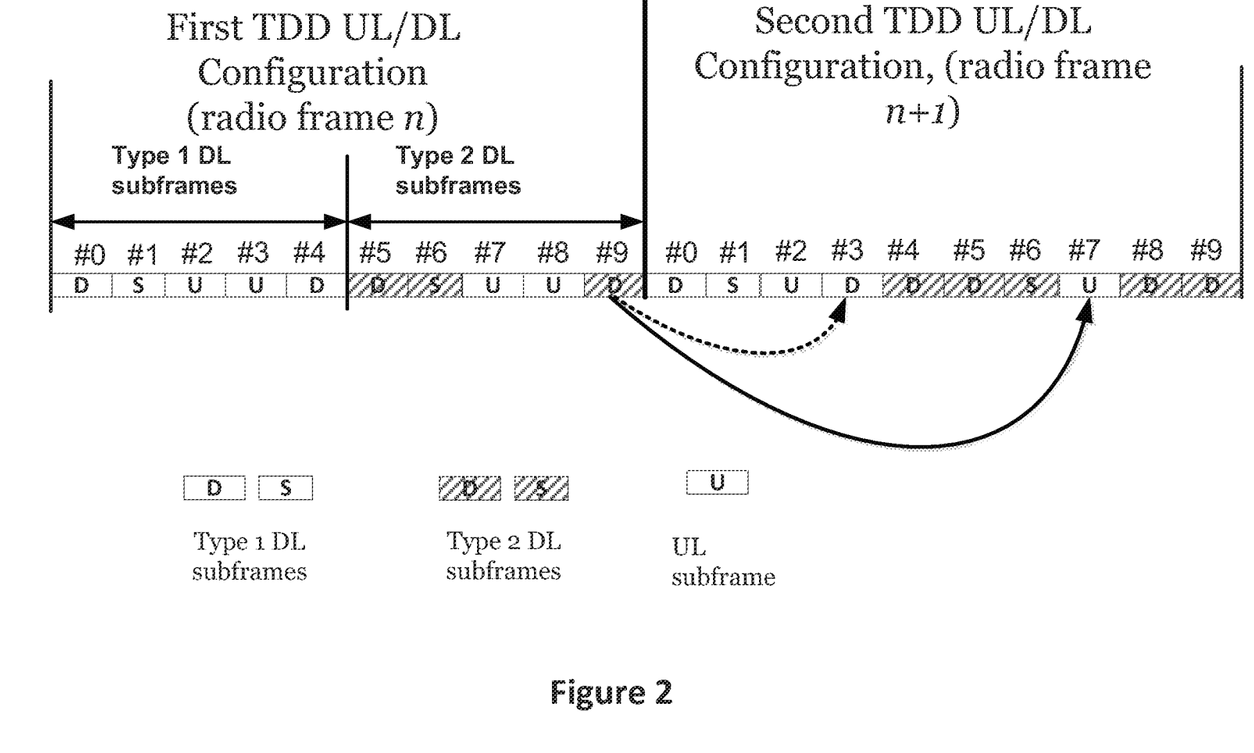
FIG. 2 illustrates an example of a Hybrid Automatic Repeat reQuest (HARQ) process that spans different time division duplex (TDD) uplink/downlink (UL/DL) configurations, in accordance with various embodiments.

FIG. 2 depicts an example of a first radio frame, designated as radio frame n, and a second radio frame, designated as radio frame n+1 that immediately follows radio frame n. As can be seen, each radio frame includes 10 distinct subframes, though other embodiments a radio frames may have a greater or lesser number of subframes. In some embodiments, a radio frame may be 10 milliseconds (ms) long, and each subframe of the radio frame may be 1 ms long.

As shown in FIG. 2, radio frame n may have a first TDD UL/DL configuration, and radio frame n+1 may have a second TDD UL/DL configuration. As shown in FIG. 2, the first TDD UL/DL configuration may be TDD UL/DL configuration 1 of Table 1, and the second TDD UL/DL configuration may be TDD UL/DL configuration 2 of Table 1. In embodiments, it may be useful for the UE 108 to be informed of when the TDD UL/DL configuration of radio frame n will be changed to the TDD UL/DL configuration of radio frame n+1.

As noted above, the eNB 104 may inform the UE 108 of the TDD UL/DL configuration of a given radio frame via a given message such as a DCI message. The eNB 104 may have a plurality of different options, herein referred to as DCI options, by which it can inform the UE 108 of the change in the TDD UL/DL configuration between radio frames n and n+1. In some embodiments, the UE 108 may be notified of the specific DCI option being used, for example via an indicator on a control channel such as the PDCCH. In other embodiments, the UE 108 may be preconfigured to process a DCI message according to a certain DCI option, and therefore an indication to the UE 108 may not be necessary.

As a first option (referred to herein as DCI option 1), the DCI message that indicates a TDD UL/DL configuration for a given radio frame may be transmitted from the eNB 104 to the UE 108 in a subframe or more subframes of that radio frame. For example, the DCI message that indicates the TDD UL/DL configuration for radio frame n may be transmitted in a subframe of radio frame n, while the DCI message that indicates the TDD UL/DL configuration for radio frame n+1 may be transmitted in a subframe of radio frame n+1. In embodiments, the DCI message may be transmitted in one or more of subframes 0, 1, 5, or 6 of a given frame, which may be referred to as an indication region for that frame. In some embodiments, if the DCI message is transmitted in multiple subframes of the radio frame, the DCI message may include a full indication of the TDD UL/DL configuration by which the UE 108 can identify the TDD UL/DL configuration specified by the DCI message. That is, if the DCI message was transmitted in both subframes 0 and 1, the UE 108 may be able to identify the TDD UL/DL configuration based on the DCI message in either subframe 0 or 1. In other embodiments, if the DCI message is transmitted in multiple subframes of the radio frame, the DCI message may include only a partial indication of the TDD UL/DL configuration by which the UE 108 can identify the TDD UL/DL configuration specified by the DCI message. That is, if the DCI message was transmitted in both subframes 0 and 1, the UE 108 may be able to identify the TDD UL/DL configuration based on the DCI message in both subframes 0 and 1.

As a second option (referred to herein as DCI option 2), the DCI message that indicates a TDD UL/DL configuration for a given radio frame may be transmitted from the eNB 104 to the UE 108 in one or more subframes of that radio frame, as well as one or more subframes of the radio frame that immediately precedes that radio frame. For example, the DCI message that indicates the TDD UL/DL configuration for radio frame n+1 may be transmitted in one or more subframes of radio frame n and one or more subframes of radio frame n+1. Specifically, the DCI message that indicates the TDD UL/DL configuration for radio frame n+1 may be transmitted in subframes 5 and/or 6 of radio frame n, and additionally or alternatively the DCI message that indicates the TDD UL/DL configuration for radio frame n+1 may be transmitted in subframes 0 and/or 1 of radio frame n+1. In some embodiments the DCI message may be transmitted on all of the subframes discussed above, while in embodiments the DCI message may only be transmitted on a subset of the subframes discussed above. As discussed above with respect to the first option, in some embodiments the DCI message transmitted in a given subframe may include a full indication of the TDD UL/DL configuration for radio frame n+1, while in other embodiments the DCI message may only include a partial indication of the TDD UL/DL configuration for radio frame n+1.

As a third option (referred to herein as DCI option 3), the DCI message that indicates a TDD UL/DL configuration for a given radio frame may be transmitted from the eNB 104 to the UE 108 only in one or more subframes of the radio frame that immediately precedes the given radio frame. That is, the DCI message that indicates a TDD UL/DL configuration for radio frame n+1 may only be transmitted in one or more subframes of radio frame n. Specifically, the DCI message that indicates a TDD UL/DL configuration for radio frame n+1 may be transmitted in subframes 0, 1, 5, or 6 of radio frame n. As indicated above for the DCI option 1, in some embodiments the DCI message transmitted in a given subframe may include a full indication of the TDD UL/DL configuration for radio frame n+1, while in other embodiments the DCI message may only include a partial indication of the TDD UL/DL configuration for radio frame n+1.

In embodiments, the different TDD UL/DL configurations in radio frames n and n+1 may affect the timing of a HARQ process. As discussed above, the HARQ process may involve one entity of a network receiving a data transmission and then communicating to the sender that the data transmission was (or was not) received appropriately. For example, the UE 108 may receive a data transmission from the eNB 104 on a DL subframe, as described above, and then the UE 108 may communicate to the eNB 104 that the UE 108 received the data correctly by way of a HARQ-ACK message on a UL subframe. The HARQ process may require a delay of at least four milliseconds (ms) between the data transmission and the HARQ-ACK message. For example, with reference to FIG. 2, if the UE 108 receives data from an eNB on DL subframe 0 of radio frame n, then the first subframe at which the UE 108 may transmit the HARQ-ACK message would be subframe 4. However, subframe 4 is not a UL subframe in radio frame n, and therefore the UE 108 may not be able to transmit the UL HARQ-ACK message until UL subframe 7 of radio frame n.

Due to this enforced time delay, a change in TDD UL/DL configurations between radio frame n and radio frame n+1 may cause delays and decreased throughput in the radio frame. If both radio frames n and n+1 had TDD UL/DL configuration 1, a UE 108 would respond to a data transmission received on DL subframe 9 in radio frame n with a HARQ-ACK transmission on subframe 3, given that subframe 3 of the TDD UL/DL configuration 1 is a UL subframe. However, when the radio frame n+1 has a TDD UL/DL configuration 2, as shown in FIG. 2, subframe 3 may be a DL subframe, thereby preventing the HARQ-ACK transmission on subframe 3, as shown by the dotted line. Thus, in this instance, the UE 108 may have to wait until the next UL subframe of radio frame n+1, that is subframe 7 of radio frame n+1, to transmit the HARQ-ACK transmission. This delay may increase the time of the HARQ process from 4 ms to 8 ms, which may be undesirable in high speed communications where one or more additional actions or messages are dependent upon receipt by the eNB 104 of the HARQ-ACK transmission from the UE 108. Similar delays may be caused for HARQ-ACK transmissions from the eNB 104 in response to a data message received from the UE 108.

In some embodiments it may be useful to classify the DL and UL subframes of a given radio frame according to one of two types, type 1 or type 2. This classification may be based, for example, on the position of the associated single UL/DL subframe used for HARQ-ACK feedback as shown in FIG. 2.

A type 1 subframe may be a DL or UL subframe carrying PDSCH or PUSCH data signals, in other words a DL or UL subframe in which data may be received from the eNB 104 or transmitted to the eNB respectively, for which the corresponding UL or DL HARQ-ACK message is sent in the same frame and is not affected by the change of frame configuration between frame n and n+1. In the embodiment shown in FIG. 2, subframes 0, 1, and 4 in radio frame n may be DL type 1 subframes, while subframes 2 and 3 may be UL type 1 subframes. In radio frame n+1, subframes 0, 1, and 3 may be DL type 1 subframes, while subframe 2 may be a UL type 1 subframe.

A type 2 subframe may be a DL or UL subframe carrying PDSCH or PUSCH data signals for which the corresponding UL or DL HARQ-ACK signal is to be sent in the next radio frame, and thus can be affected by the change of TDD UL/DL configuration between frames n and n+1. As shown in FIG. 2, the DL type 2 subframes within radio frame n may include subframes 5, 6, and 9. The UL type 2 subframes within radio frame n may include subframes 7 and 8. By contrast, the DL type 2 subframes of radio frame n+1 may include subframes 4, 5, 6, 8 and 9. The UL type 2 subframes of radio frame n+1 may include subframe 7.

One classification of subframes within each radio frame for TDD UL/DL configurations 0-6 may be classified as shown in Table 2:

TABLE 2

TDD UL/DL Type 1 and Type 2 Subframes

| TDD UL/DL configuration | Type 1 Subframe Number | | Type 2 Subframe Number | |
|---|---|---|---|---|
| | DL | UL | DL | UL |
| 0 | 0, 1, 5 | 2 | 6 | 3, 4, 7, 8, 9 |
| 1 | 0, 1, 4 | 2, 3 | 5, 6, 9 | 7, 8 |
| 2 | 0, 1, 3 | 2 | 4, 5, 6, 8, 9 | 7 |
| 3 | 0 | 2, 3 | 1, 5, 6, 7, 8, 9 | 4 |
| 4 | — | 2, 3 | 0, 1, 4, 5, 6, 7, 8, 9 | — |
| 5 | — | 2 | 0, 1, 3, 4, 5, 6, 7, 8, 9 | — |
| 6 | 0, 1 | 2, 3 | 5, 6, 9 | 4, 7, 8 |

In embodiments where the TDD UL/DL configuration of radio frame n is different than the TDD UL/DL configuration of radio frame n+1, a UE such as UE 108 may be configured to determine the UL HARQ-ACK timing for data received on the PDSCH according to the type of DL subframes as depicted above in Table 2. Specifically, for a given DL type 1 subframe within the radio frame n, the timing for the HARQ-ACK signal corresponding to the data received on the DL type 1 subframe may follow the TDD UL/DL configuration for radio frame n.

In embodiments where the TDD UL/DL configuration of radio frame n is different than the TDD UL/DL configuration of radio frame n+1, the TDD UL/DL configuration used to identify the timing of the HARQ-ACK signal transmitted by the UE 108 in response to data received in a DL type 2 subframe may be determined as described below. In each of the three cases below, the identified TDD UL/DL configuration may be considered a "reference" TDD UL/DL configuration. In embodiments, the reference TDD UL/DL configuration may be considered a DL-reference TDD UL/DL configuration, which will be a term used herein to distinguish from a UL-reference TDD UL/DL configuration as discussed below.

Specifically, in a first case, the HARQ-ACK timing for DL type 2 subframes in radio frame n may follow the TDD UL/DL configuration of radio frame n+1 if the DL subframes in the TDD UL/DL configuration of radio frame n is a subset of the DL subframes in the TDD UL/DL configuration of radio frame n+1. In other words, the DL-reference TDD UL/DL configuration may be the TDD UL/DL configuration of radio frame n+1.

Otherwise, in a second case, the HARQ-ACK timing for DL type 2 subframes in radio frame n may follow the TDD UL/DL configuration of radio frame n if the DL subframes in the TDD UL/DL configuration of radio frame n is a superset of the DL subframes of the TDD UL/DL configuration of radio frame n+1. In other words, the DL-reference TDD UL/DL configuration may be the TDD UL/DL configuration of radio frame n.

Otherwise, in a third case, the HARQ-ACK timing for DL type 2 subframes in radio frame n may follow a TDD UL/DL configuration that is different from the TDD UL/DL configuration of radio frames n or n+1 if the DL subframes of the TDD UL/DL configuration for radio frame n is neither a subset nor a superset of the DL subframes of the TDD UL/DL configuration of radio frame n+1. Specifically, the HARQ-ACK timing for DL type 2 subframes in radio frame n may be a TDD UL/DL configuration with UL subframes that are UL subframes in the TDD UL/DL configurations of both radio frames n and n+1. In other words, the DL-reference TDD UL/DL configuration may be a TDD UL/DL configuration with UL subframes that are UL subframes in both the TDD UL/DL configuration of radio frame n and the TDD UL/DL configuration of radio frame n+1.

In other embodiments different logic may be used to identify a DL-reference TDD UL/DL configuration. For example, rather than comparing the DL subframes of radio frames n or n+1, the UL subframes, or some other criteria, may be used to identify a DL-reference TDD UL/DL configuration. Table 3, below, provides an example of the DL-reference TDD UL/DL configuration for various combinations of the TDD UL/DL configuration of radio frame n and the TDD UL/DL configuration of radio frame n+1. In some embodiments, one or both of the UE 108 or the eNB 104 may be configured with tables 2 or 3 implemented or stored thereon. In some embodiments, one or both of the UE 108 or the eNB 104 may be configured to identify the type of subframes or the DL-reference TDD UL/DL configuration for radio frame n or n+1 dynamically, i.e. on the fly.

TABLE 3

DL-Reference TDD UL/DL Configurations

| (TDD UL/DL configuration in radio frame n, TDD UL/DL configuration in radio frame n + 1), where n ≥ 0 | DL-Reference TD UL/DL configuration |
|---|---|
| (0, 0) | 0 |
| (1, 0), (1, 1), (1, 6), (0, 1), (6, 1) | 1 |
| (2, 0), (2, 2), (2, 1), (2, 6), (0, 2), (1, 2), (6, 2) | 2 |
| (3, 0), (3, 3), (3, 6), (0, 3), (6, 3) | 3 |
| (4, 0), (4, 1), (4, 3), (4, 4), (4, 6), (0, 4), (1, 4), (3, 4), (6, 4), (3, 1), (1, 3) | 4 |

TABLE 3-continued

DL-Reference TDD UL/DL Configurations

| (TDD UL/DL configuration in radio frame n, TDD UL/DL configuration in radio frame n + 1), where n ≥ 0 | DL-Reference TD UL/DL configuration |
|---|---|
| (5, 0), (5, 1), (5, 2), (5, 3), (5, 4), (5, 5), (5, 6), (3, 2), (4, 2), (2, 3), (2, 4), (0, 5), (1, 5), (2, 5), (3, 5), (4, 5), (6, 5) | 5 |
| (0, 6), (6, 0), (6, 6) | 6 |

In addition to the combinations listed above in Table 3, several complementary alternative DL-reference TDD UL/DL configurations for some special pairs are listed below. Use of the alternative DL-reference TDD UL/DL configurations discussed below may either reduce the complexity of UE 108 implementation, or increase the peak data rate as seen by the UE 108.

For the TDD UL/DL configuration pair of (0, Y) for radio frame n and n+1, respectively, where Y is any legacy UL/DL configuration 0-6, the DL-reference TDD UL/DL configuration used to respond to data received from an eNB 104 in a DL type 2 subframe in radio frame n may be TDD UL/DL configuration 0, taking into account that subframe #2 may be unchanged in the UL direction in all legacy TDD UL/DL configurations. Specifically, a fixed DL-reference TDD UL/DL configuration (i.e. TDD configuration 0) for transmitting a UL HARQ-ACK feedback signal in radio frame n upon the TDD UL/DL configuration may be detected for radio frame n, which may in turn prevent the UE 108 from using a false DL-reference TDD UL/DL configuration based on an incorrect detection of the UL/DL configuration in radio frame n+1.

For the pair of (6, 3), the DL-reference TDD UL/DL configuration may be TDD UL/DL configuration 6, which may have the result of optimizing the HARQ-ACK performance and improving DL throughput. The HARQ-ACK bundling windows size, which may refer to the number of PDSCH subframes associated with one single UL subframe, may be 1 with this modified solution (i.e. when the DL-reference TDD UL/DL configuration is TDD UL/DL configuration 6). By contrast, the HARQ-ACK bundling windows size may be 1 or 2 with the original solution (i.e. when the DL-reference TDD UL/DL configuration is TDD UL/DL configuration 3). Consequently, the complementary solution may outperform the original solution described in Table 3 in terms of downlink throughput performance as expected.

Moreover, the DL-reference TDD UL/DL configuration may be configuration Y for the pair of (X, Y) which may have the property that DL type 2 subframe(s) in configuration X may also be DL subframes in configuration Y. The pairs of (X, Y) may include:

(0, Y), where Y is any legacy UL/DL configuration 1-6; or
(1, 2), (1, 3), (1, 4), (1, 5), (1, 6), (2, 4), (2, 5), (3, 4), (3, 5), (4, 5), (6, 1), (6, 2), (6, 3), (6, 4), or (6, 5).

For the pair of (2,3), the DL-reference TDD UL/DL configuration may be TDD UL/DL configuration 3 and HARQ-ACK feedback for DL type 1 subframes and type 2 subframe 4 in radio frame n may follow the TDD UL/DL configuration 2.

For the pairs where the DL-reference TDD UL/DL configuration is configuration 5 in Table 3, for example the pairs (5, 0), (5, 1), etc., in some embodiments data received in an earlier PDSCH signal may get a later HARQ-ACK feedback than data received in a later PDSCH signal. Specifically the HARQ-ACK transmission corresponding to data received in subframe 9 of radio frame n may be later than the HARQ-ACK transmission corresponding to data received in subframe 0 in radio frame n+1 if following the HARQ-ACK timeline as defined in Table 3, despite the fact that the data transmission in subframe 9 of radio frame n was transmitted at an earlier time than the data transmission in subframe 0 of radio frame n+1. Therefore, in some embodiments the TDD UL/DL configuration may be modified such that the HARQ-ACK feedback subframe for data received in subframe 9 in radio frame n is assigned to be the first UL subframe that is greater than or equal to subframe 3 of radio frame n+1, rather than simply following the TDD UL/DL configuration 5 as proposed in 3. Alternatively, the HARQ-ACK timing corresponding to data received in subframe 9 of radio frame n may follow the TDD UL/DL configuration of subframe n+1 if subframe 9 is a DL subframe in the TDD UL/DL configuration of radio frame n+1; otherwise the HARQ-ACK feedback associated with data received in subframe 9 of radio frame n may be altered such that the HARQ-ACK feedback is transmitted in subframe 2 of radio frame n+1, such as described above in Table 3 for the pair (5,0).

It should be noted that the UL HARQ-ACK timing for data received in all DL subframes of radio frame n, regardless of the type of DL subframe (i.e. type 1 or type 2), may possibly follow the DL-reference TDD UL/DL configuration defined in Table 3, or the complementary alternative DL-reference TDD UL/DL configurations for some special pairs as described above, rather than only being used for DL type 2 subframe(s) of radio frame n, in some embodiments provided that the DCI option 3 as described above is applied.

The descriptions above have been primarily with reference to UL HARQ-ACK signals sent by the UE 108 in response to data received from the eNB 104 on the PDSCH. However, in some embodiments similar timing considerations for HARQ processes may be applied to HARQ-ACK signals sent by the eNB 104 in response to data transmitted by the UE 108 on the PUSCH. In some embodiments, the timing considerations may dictate when the UE 108 should expect to receive the HARQ-ACK signals from the eNB 104. In some embodiments, the timing considerations may dictate when the UE 108 should expect to transmit the data to the eNB 104 on the PUSCH.

Figure 3:
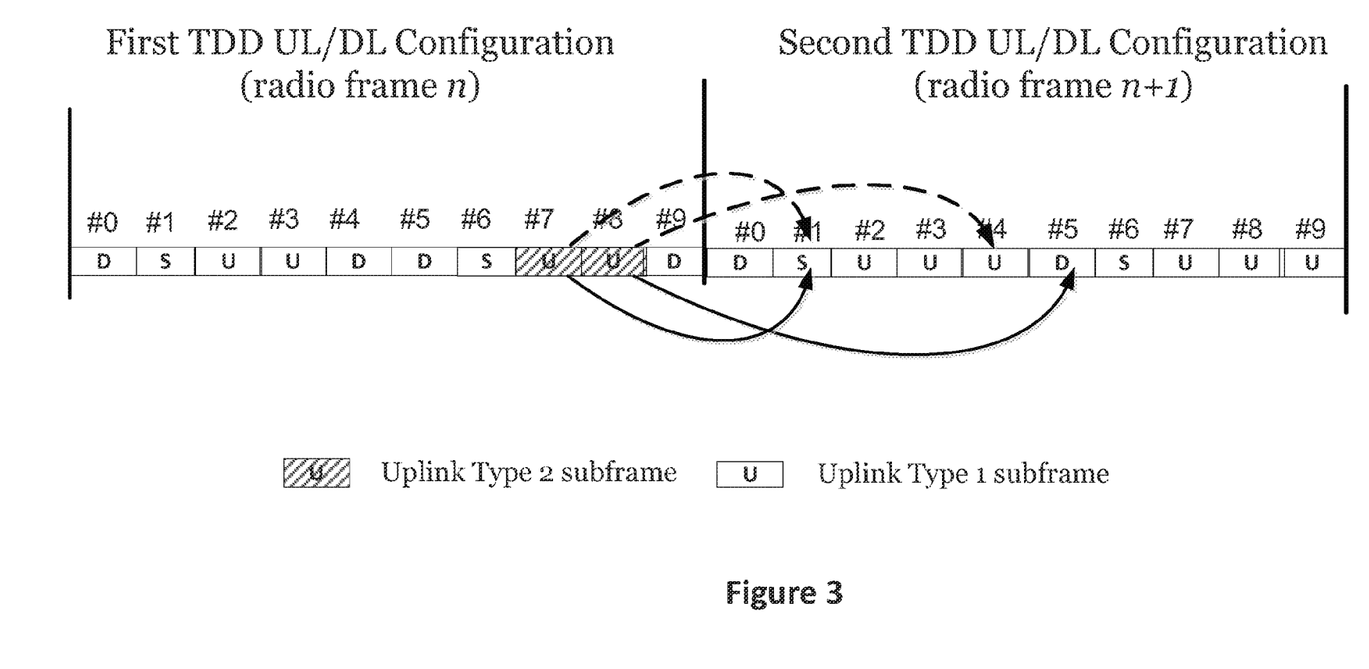
FIG. 3 illustrates another example of a HARQ process that spans different TDD UL/DL configurations, in accordance with various embodiments.

FIG. 3 depicts an example of a HARQ process wherein a UE 108 transmits a data signal to the eNB 104 on the PUSCH, and the eNB 104 responds by transmitting a HARQ-ACK on a DL subframe. As shown in FIG. 3, the TDD UL/DL configuration for radio frame n may be different than the TDD UL/DL configuration for radio frame n+1. In the embodiment shown in FIG. 3, the TDD UL/DL configuration of radio frame n may be TDD UL/DL configuration 1, and the TDD UL/DL configuration of radio frame n+1 may be TDD UL/DL configuration 0. As shown in FIG. 3 and indicated by the dashed line, data transmitted by a UE 108 in UL subframe 7 of radio frame n, which may be a UL type 2 subframe, may receive a corresponding HARQ-ACK signal from the eNB 104 on DL subframe 1 of radio frame n+1 if radio frame n+1 was following the TDD UL/DL configuration of radio frame n. Additionally, as indicated by the dashed line, data transmitted by a UE 108 in UL subframe 8 of radio frame n, which may be a UL type 2 subframe, may receive a corresponding HARQ-ACK signal from the eNB 104 on DL subframe 4 of radio frame n+1 if radio frame n+1 was following the TDD UL/DL configuration of radio frame n.

However, as shown in FIG. 3, because radio frame n+1 is not following the TDD UL/DL configuration of radio frame n, subframe 4 of radio frame n+1 is a UL subframe. Therefore, the eNB 104 may not transmit a HARQ-ACK signal to the UE 108. The first available subframe which the eNB 104 may use to transmit a HARQ-ACK signal to the UE 108 may be DL subframe 4 of radio frame n+1.

For DCI option 1 or DCI option 2, as described above, the UE 108 may, upon detection of a DCI signal received on the PDCCH from the eNB 104 having a DCI format 0/4 in subframe i of radio frame n and intended for the UE 108, adjust the corresponding PUSCH transmission in subframe i+k (k≥4) by following the TDD UL/DL configuration of radio frame n. In other words, the reference TDD UL/DL configuration, which will be referred to herein as a UL-reference TDD UL/DL configuration to distinguish from the DL-reference TDD UL/DL configurations discussed above, may be the TDD UL/DL configuration of radio frame n. However, this adjustment may in some embodiments result in a degraded uplink spectrum efficiency in the embodiment wherein the number of UL subframes is increased in radio frame n+1 compared to the previous TDD UL/DL configuration of radio frame n, such as the embodiment wherein the TDD UL/DL configuration is changed from TDD UL/DL configuration 1 in radio frame n to TDD UL/DL configuration 2 in radio frame n+1.

For DCI option 3 (i.e. the TDD UL/DL configuration in radio frame n+1 is indicated in the common DCIs transmitted in radio frame n) a UL-reference TDD UL/DL configuration may be identified for the PUSCH as follows. Specifically, the UE 108 may, upon detection of a PDCCH with DCI format 0/4 in subframe i of radio frame n intended for the UE 108, adjust the corresponding PUSCH transmission in subframe i+k (k≥4) by following the UL-reference UL/DL configuration defined for the corresponding pair formed by the TDD UL/DL configuration for radio frame n and the TDD UL/DL configuration for radio frame n+1 as shown below in Table 4.

TABLE 4

UL-Reference TDD UL/DL Configurations

| UL-reference TDD UL/DL Configuration | | TDD UL/DL configuration in radio frame n + 1 | | | | | | |
|---|---|---|---|---|---|---|---|---|
| | | 0 | 1 | 2 | 3 | 4 | 5 | 6 |
| TDD UL/DL configuration in radio frame n | 0 | | 0 | 0 | 0 | 0 | 0 | 0 |
| | 1 | 0 | | 1 | 6 | 1 | 1 | 6 |
| | 2 | 0 | 1 | | 6 | 1 | 2 | 6 |
| | 3 | 0 | 6 | 6 | | 3 | 3 | 6 |
| | 4 | 0 | 1 | 1 | 3 | | 4 | 6 |
| | 5 | 0 | 1 | 2 | 3 | 4 | | 6 |
| | 6 | 0 | 6 | 6 | 6 | 6 | 6 | |

As shown in Table 4, certain of the UL-reference TDD UL/DL configurations may be special cases such as the combinations for n and n+1 such as (3, 1), (3, 2), (4, 2), (1, 3), (2, 3), and (2, 4). As an example of these special cases, in one embodiment, TDD UL/DL configuration 2 may be used for HARQ timing in radio frame n and TDD UL/DL configuration 3 may be used for HARQ timing in radio frame n+1. With DCI option 3, described above, both of these TDD UL/DL configurations in radio frames n and n+1 may be known by the UE 108 due to the DCI signals in radio frame n and the radio frame immediately preceding radio frame n. Therefore, the UE 108 may, upon detection of a PDCCH with DCI format 0/4 in subframe i of radio frame n intended for the UE 108, adjust the corresponding PUSCH transmission in subframe i+k (k≥4) by following a UL-reference TDD UL/DL configuration 6 as shown in Table 4, above.

In some embodiments, a DL HARQ-ACK signal may be mapped to the DL subframe without any legacy PHICH resources or a UL subframe in the radio frame n+1. This mapping may happen, for example, if the TDD UL/DL configuration in radio frame n (as shown in FIG. 3) is used to determine the HARQ-ACK timeline. This mapping may in some cases be undesirable because in some embodiments PHICH may not be enabled because inclusion/exclusion of PHICH resources may affect the PDCCH interleaving and mapping procedures, which should be taken into account when designing the DL HARQ-ACK transmission timeline for UL type 2 subframes.

For a UL subframe within the radio frame n, the HARQ-ACK timing may follow the UL-reference UL/DL configuration defined for the corresponding pair formed by (TDD UL/DL configuration in radio frame n, TDD UL/DL configuration in radio frame n+1), as depicted above in Table 4. This UL-reference UL/DL configuration may desirably maintain commonality of the HARQ-ACK timeline for a DL HARQ-ACK signal that is transmitted in response to a UL data signal. Specifically, the commonality may be maintained between a cell-specific TDD UL/DL configuration and the TDD UL/DL dynamic reconfiguration discussed herein.

In one embodiment, the adaptive retransmission for PUSCH in subframe 8 of radio frame n may be achieved for the pair of (1, 0) by using the HARQ-ACK timing of configurations 0 or 6 for UL type 2 subframes (i.e. subframes 7 and 8 as shown in FIG. 3), rather than the TDD UL/DL configuration 1.

In some embodiments, the physical (PHY) layer in the UE 108 may deliver indications to higher layers in the UE 108 such as the media access control (MAC) layer or transport layer. The indications may include, for example, an ACK message. Specifically, assume that a UE 108 is enabled with UL/DL reconfiguration functionality and UL/DL reconfiguration happens after radio frame n. Also, for subframe i in radio frame n+1, assume a transport block was transmitted in the associated PUSCH subframe. Then, if a PHICH resource corresponding to that transport block is not present in subframe i according to the TDD UL/DL configuration contained in a SIB1 (System Information Block Type 1) message, an ACK message for that transport block may be delivered to the higher layers.

Figure 4:
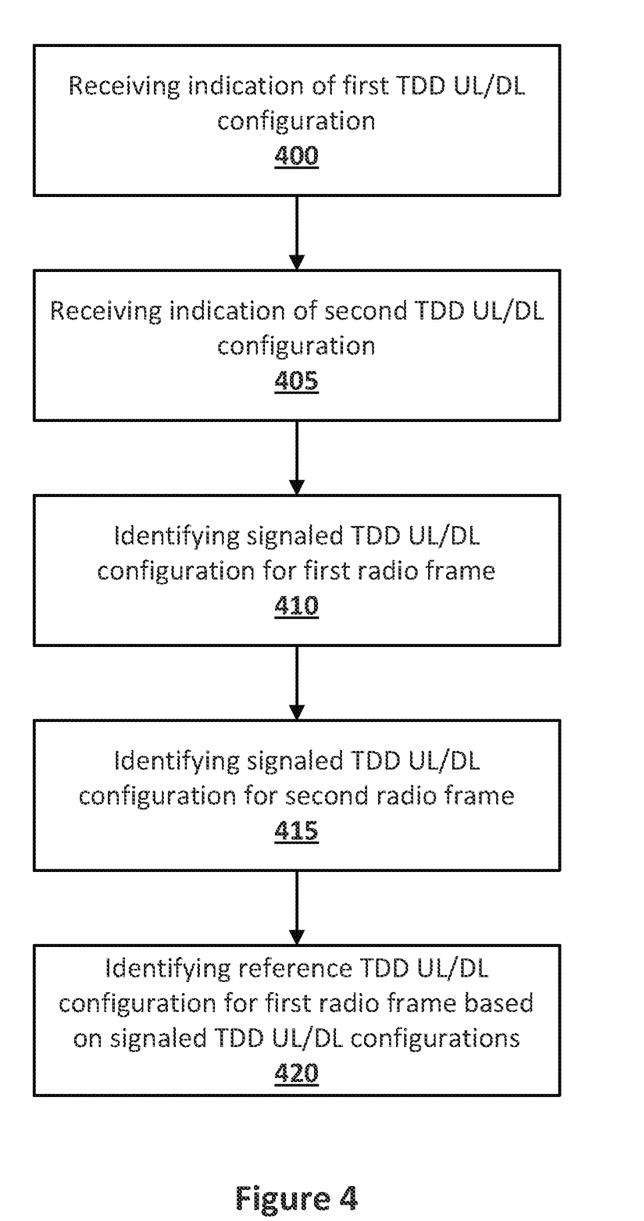
FIG. 4 illustrates an example method for identifying a reference TDD UL/DL configuration, in accordance with various embodiments.

FIG. 4 depicts a high level summary process for the DCI signaling and subsequent identification of the UL or DL reference TDD UL/DL configuration. Initially, a UE 108 may receive an indication of a first TDD UL/DL configuration for a first subframe, for example subframe n, at 400. Next, the UE 108 may receive an indication of a second TDD UL/DL configuration for a second subframe, for example subframe n+1, at 405. The indications received at 400 or 405 may be received in DCI signaling in one or more of subframes 0, 1, 5, or 6 of a radio frame, as explained above with respect to DCI options 1, 2, and 3.

Based on the indications of the first and second TDD UL/DL configurations, the UE 108 may identify the signaled TDD UL/DL configuration for the first radio frame n at 410 and the signaled TDD UL/DL configuration for the second radio frame n+1 at 415. The UE 108 may then identify a reference TDD UL/DL configuration at 420. Specifically, the UE 108 may identify the reference TDD UL/DL configuration to use for timing of a HARQ-ACK signal transmitted in response to a data transmission in a subframe of radio frame n. In embodiments, the data signal may be a UL signal and the HARQ-ACK signal may be a DL signal transmitted from the eNB 104 in radio frame n+1 based on receipt of the UL signal. In other embodiments, the data signal may be a DL signal, and the HARQ-ACK signal may be a UL signal transmitted from the UE 108 in radio frame n+1 based on receipt of the DL signal from the eNB 104.

Figure 5:
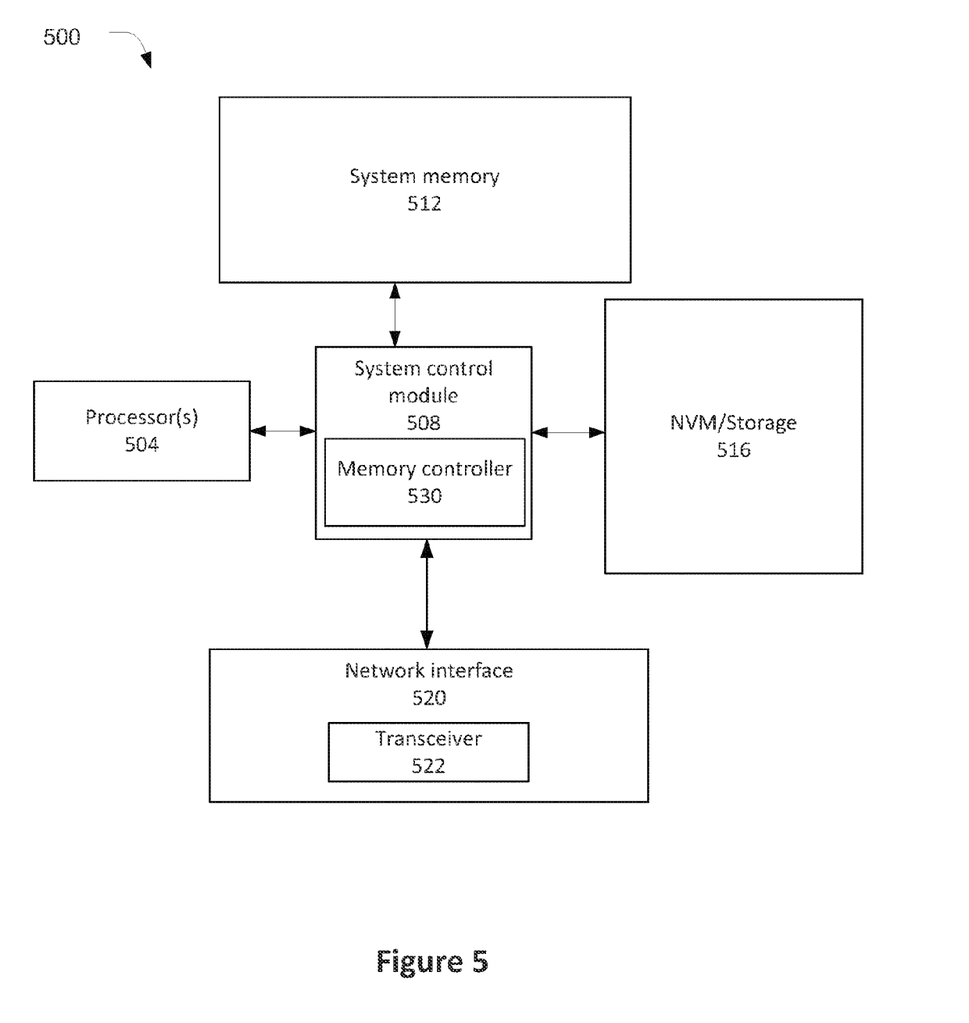
FIG. 5 schematically depicts an example system in accordance with various embodiments.

The eNB 104 and UE 108 described herein may be implemented into a system using any suitable hardware and/or software to configure as desired. FIG. 5 illustrates, for one embodiment, an example system 500 comprising one or more processor(s) 504, system control circuitry 508 coupled with at least one of the processor(s) 504, system memory 512 coupled with system control circuitry 508, non-volatile memory (NVM)/storage 516 coupled with system control circuitry 508, and a network interface 520 coupled with system control circuitry 508.

Processor(s) 504 may include one or more single-core or multi-core processors. Processor(s) 504 may include any combination of general-purpose processors and dedicated processors (e.g., graphics processors, application processors, baseband processors, etc.). In an embodiment in which the system 500 implements UE 108, processors(s) 504 may include processor circuitry 152 and be configured to execute the embodiments of FIGS. 2-4 in accordance with various embodiments. In an embodiment in which the system 500 implements eNB 104, processor(s) 504 may include processor circuitry 128 and be configured to execute the embodiments of FIGS. 2-4 in accordance with various embodiments.

System control circuitry 508 for one embodiment may include any suitable interface controllers to provide for any suitable interface to at least one of the processor(s) 504 and/or to any suitable device or component in communication with system control circuitry 508.

System control circuitry 508 for one embodiment may include one or more memory controller(s) 530 to provide an interface to system memory 512. System memory 512 may be used to load and store data and/or instructions, for example, for system 500. System memory 512 for one embodiment may include any suitable volatile memory, such as suitable dynamic random access memory (DRAM), for example.

NVM/storage 516 may include one or more tangible, non-transitory computer-readable media used to store data and/or instructions, for example. NVM/storage 516 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 516 may include a storage resource physically part of a device on which the system 500 is installed or it may be accessible by, but not necessarily a part of, the device. For example, the NVM/storage 516 may be accessed over a network via the network interface 520.

System memory 512 and NVM/storage 516 may respectively include, in particular, temporal and persistent copies of instructions 524. Instructions 524 may include instructions that when executed by at least one of the processor(s) 504 result in the system 500 implementing a method such as that described herein with regard to FIG. 4. In some embodiments, instructions 524, or hardware, firmware, and/or software components thereof, may additionally/alternatively be located in the system control circuitry 508, the network interface 520, and/or the processor(s) 504.

Network interface 520 may have a transceiver 522 to provide a radio interface for system 500 to communicate over one or more network(s) and/or with any other suitable device. The transceiver 522 may implement receiver circuitry 144 and/or transmitter circuitry 148. In various embodiments, the transceiver 522 may be integrated with other components of system 500. For example, the transceiver 522 may include a processor of the processor(s) 504, memory of the system memory 512, and NVM/Storage of NVM/Storage 516. Network interface 520 may include any suitable hardware and/or firmware. Network interface 520 may include a plurality of antennas to provide a multiple input, multiple output radio interface. Network interface 520 for one embodiment may include, for example, a network adapter, a wireless network adapter, a telephone modem, and/or a wireless modem.

For one embodiment, at least one of the processor(s) 504 may be packaged together with logic for one or more controller(s) of system control circuitry 508. For one embodiment, at least one of the processor(s) 504 may be packaged together with logic for one or more controllers of system control circuitry 508 to form a System in Package (SiP). For one embodiment, at least one of the processor(s) 504 may be integrated on the same die with logic for one or more controller(s) of system control circuitry 508. For one embodiment, at least one of the processor(s) 504 may be integrated on the same die with logic for one or more controller(s) of system control circuitry 508 to form a System on Chip (SoC).

The system 500 may further include input/output (I/O) devices (not shown). The I/O devices (not shown) may include user interfaces designed to enable user interaction with the system 500, peripheral component interfaces designed to enable peripheral component interaction with the system 500, and/or sensors designed to determine environmental conditions and/or location information related to the system 500.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 520 to communicate with components of a positioning network, e.g., a global positioning system (GPS) satellite.

In various embodiments, the system 500 may be a mobile computing device such as, but not limited to, a laptop computing device, a tablet computing device, a netbook, a mobile phone, etc. In various embodiments, system 500 may have more or less components, and/or different architectures.

A first example of the present disclosure may include a user equipment (UE) comprising: receiver circuitry to receive, from an eNodeB (eNB), a first indication of a first time division duplex (TDD) uplink/downlink (UL/DL) configuration for a first radio frame and a second indication of a second TDD UL/DL configuration that is same or different than the first TDD UL/DL configuration for a second radio frame that immediately follows the first radio frame; and Hybrid Automatic Repeat reQuest (HARQ) circuitry to: identify, based at least in part on the first indication, a first HARQ timing for a Physical Downlink Shared Channel (PDSCH) or a Physical Uplink Shared Channel (PUSCH) in the first radio frame; and identify, based at least in part on the second indication, a second HARQ timing for a PDSCH or a PUSCH in the second radio frame that immediately follows the first radio frame.

Example 2 may include the UE of example 1, wherein the first indication or the second indication is a Downlink Control Information (DCI) message.

Example 3 may include the UE of examples 1 or 2, wherein the first indication is received in a first subframe or a first set of subframes of the first radio frame and the second indication is received in a second subframe or a second set of subframes of the second radio frame.

Example 4 may include the UE of examples 1 or 2, wherein the first indication is received in a first subframe or first set of subframes of the first radio frame or a second subframe or a second set of subframes of a third radio frame immediately preceding the first radio frame, and the second indication is received in a third subframe or third set of subframes of the first radio frame or a fourth subframe or fourth set of subframes of the second radio frame.

Example 5 may include the UE of examples 1 or 2, wherein the first indication is received in a first subframe or a first set of subframes of a third radio frame that immediately precedes the first radio frame, and the second indication is received in a second subframe or a second set of subframes of the first radio frame.

Example 6 may include the UE of examples 1 or 2, wherein the first indication or the second indication are received in a DL subframe or a set of DL subframes of a TDD UL/DL configuration indicated in a SystemInformationBlockType1 (SIB1) message.

Example 7 may include the UE of example 6, wherein the first indication or the second indication are received in subframe 0, subframe 1, subframe 5, or subframe 6 of the TDD UL/DL configuration.

Example 8 may include a method comprising: receiving, by a user equipment (UE) from an eNodeB (eNB), a first indication of a first time division duplex (TDD) uplink/downlink (UL/DL) configuration for a first radio frame; receiving, by the UE, a second indication of a second TDD UL/DL configuration for a second radio frame immediately following the first radio frame; and identifying, by the UE and based at least in part on the first indication and the second indication, a reference TDD UL/DL configuration for Hybrid Automatic Repeat reQuest (HARQ) timing determination associated with a first subframe in the first radio frame.

Example 9 may include the method of example 8, further comprising identifying, by the UE, the reference TDD UL/DL configuration based at least in part on whether a HARQ acknowledgement signal associated with a data received in the first subframe is to be transmitted by the UE in the first radio frame or the second radio frame in accordance with the first TDD UL/DL configuration.

Example 10 may include the method of examples 8 or 9, wherein the reference TDD UL/DL configuration is the second TDD UL/DL configuration if DL subframes in the first TDD UL/DL configuration of the first radio frame are a subset of DL subframes in the second TDD UL/DL configuration of the second radio frame.

Example 11 may include the method of examples 8 or 9, wherein the reference TDD UL/DL configuration is the first TDD UL/DL configuration if DL subframes in the first TDD UL/DL configuration of the first radio frame are a superset of DL subframes in the second TDD UL/DL configuration of the second radio frame.

Example 12 may include the method of examples 8 or 9, wherein the first TDD UL/DL configuration has a first configuration of UL subframes and the second TDD UL/DL configuration has a second configuration of UL subframes; wherein at least a portion of the UL subframes in the first TDD UL/DL are UL subframes in the second TDD UL/DL configuration; and wherein the reference TDD UL/DL configuration is a third TDD UL/DL configuration having a configuration of UL subframes that only includes the portion of UL subframes.

Example 13 may include the method of example 12, wherein the reference TDD UL/DL configuration is TDD UL/DL configuration 4 if the first TDD UL/DL configuration is TDD UL/DL configuration 3 and the second TDD UL/DL configuration is TDD UL/DL configuration 1; wherein the reference TDD UL/DL configuration is TDD UL/DL configuration 4 if the first TDD UL/DL configuration is TDD UL/DL configuration 1 and the second TDD UL/DL configuration is TDD UL/DL configuration 1; wherein the reference TDD UL/DL configuration is TDD UL/DL configuration 5 if the first TDD UL/DL configuration is TDD UL/DL configuration 3 or TDD UL/DL configuration 4, and the second TDD UL/DL configuration is TDD UL/DL configuration 2; and wherein the reference TDD UL/DL configuration is TDD UL/DL configuration 5 if the first TDD UL/DL configuration is TDD UL/DL configuration 2, and the second TDD UL/DL configuration is TDD UL/DL configuration 3 or TDD UL/DL configuration 4.

Example 14 may include the method of example 12, wherein the reference TDD UL/DL configuration is TDD UL/DL configuration 0 if the first TDD UL/DL configuration is TDD UL/DL configuration 0; wherein the reference TDD UL/DL configuration is TDD UL/DL configuration 6 if the first TDD UL/DL configuration is TDD UL/DL configuration 6, and the second TDD UL/DL configuration is TDD UL/DL configuration 3; and wherein the reference TDD UL/DL configuration is the TDD UL/DL configuration 3 if the first TDD UL/DL configuration is TDD UL/DL configuration 2, and the second TDD UL/DL configuration is TDD UL/DL configuration 3.

Example 15 may include the method of example 12, further comprising transmitting, by the UE, a HARQ acknowledgement signal from the UE in accordance with the reference TDD UL/DL configuration.

Example 16 may include the method of example 15, further comprising transmitting, by the UE, the HARQ acknowledgement signal on a third generation partnership project (3GPP) physical uplink control channel (PUCCH) or a Physical Uplink Shared Channel (PUSCH).

Example 17 may include one or more non-transitory computer readable storage media comprising instructions to cause a user equipment (UE), upon execution of the instructions by a processor of the UE, to: receive a first indication of a time division duplex (TDD) uplink/downlink (UL/DL) configuration for a first radio frame; receive, from an eNodeB (eNB), a second indication of a second TDD UL/DL configuration for a second radio frame immediately following the first radio frame; identify, based at least in part on the first TDD UL/DL configuration and the second TDD UL/DL configuration, a reference TDD UL/DL configuration for a Hybrid Automatic Repeat reQuest (HARQ) timing in the first radio frame; and transmit a UL HARQ acknowledgement (HARQ-ACK) message or a physical uplink shared channel (PUSCH) message based at least in part on the reference TDD UL/DL configuration.

Example 18 may include the one or more computer readable storage media of example 17, wherein the instructions further include instructions to receive a HARQ feedback associated with a PUSCH message in the first radio frame based at least in part on the reference TDD UL/DL configuration.

Example 19 may include the one or more computer readable storage media of examples 17 or 18, wherein the reference TDD UL/DL configuration is equal to the first TDD UL/DL configuration.

Example 20 may include the one or more computer readable storage media of examples 17 or 18, wherein the reference TDD UL/DL configuration is equal to the second TDD UL/DL configuration.

Example 21 may include the one or more computer readable storage media of examples 17 or 18, wherein the reference TDD UL/DL configuration is not equal to the first TDD UL/DL configuration or the second TDD UL/DL configuration.

Example 22 may include the one or more computer readable storage media of examples 17 or 18, wherein the indication is a downlink control information (DCI) message.

Example 23 may include the one or more computer readable storage media of examples 17 or 18, wherein the UL HARQ-ACK message is a message on a third generation partnership project (3GPP) physical uplink shared channel (PUSCH) or a 3GPP physical uplink control channel (PUCCH).

Example 24 may include a method comprising: receiving, at a UE from an eNodeB (eNB), a first indication of a first time division duplex (TDD) uplink/downlink (UL/DL) configuration for a first radio frame and a second indication of a second TDD UL/DL configuration that is same or different than the first TDD UL/DL configuration for a second radio frame that immediately follows the first radio frame; identifying, at the UE based at least in part on the first indication, a first HARQ timing for a Physical Downlink Shared Channel (PDSCH) or a Physical Uplink Shared Channel (PUSCH) in the first radio frame; and identifying, at the UE based at least in part on the second indication, a second HARQ timing for a PDSCH or a PUSCH in the second radio frame that immediately follows the first radio frame.

Example 25 may include the method of example 24, wherein the first indication or the second indication is a Downlink Control Information (DCI) message.

Example 26 may include the method of examples 24 or 25, further comprising: receiving, by the UE, the first indication in a first subframe or a first set of subframes of the first radio frame; and receiving, by the UE, the second indication in a second subframe or a second set of subframes of the second radio frame.

Example 27 may include the method of examples 24 or 25, further comprising: receiving, by the UE, the first indication in a first subframe or first set of subframes of the first radio frame or a second subframe or a second set of subframes of a third radio frame immediately preceding the first radio frame; and receiving, by the UE, the second indication in a third subframe or third set of subframes of the first radio frame or a fourth subframe or fourth set of subframes of the second radio frame.

Example 28 may include the method of examples 24 or 25, further comprising: receiving, by the UE, the first indication in a first subframe or a first set of subframes of a third radio frame that immediately precedes the first radio frame; and receiving, by the UE, the second indication in a second subframe or a second set of subframes of the first radio frame.

Example 29 may include the method of examples 24 or 25, further comprising receiving, by the UE, the first indication or the second indication in a DL subframe or a set of DL subframes of a TDD UL/DL configuration indicated in a SystemInformationBlockType1 (SIB1) message.

Example 30 may include the method of example 29, further comprising receiving, by the UE, the first indication or the second indication in subframe 0, subframe 1, subframe 5, or subframe 6 of the TDD UL/DL configuration.

Example 31 may include an apparatus comprising means to perform the method of any of examples 24-30.

Example 32 may include one or more computer readable storage media comprising instructions to cause a user equipment (UE), in response to execution of the instructions by the UE, to perform the method of any of examples 24-30.

Example 33 may include an apparatus comprising means to perform the method of any of examples 8-16.

Example 34 may include one or more computer readable storage media comprising instructions to cause a user equipment (UE), in response to execution of the instructions by the UE, to perform the method of any of examples 8-16.

Example 35 may include a user equipment (UE) comprising: receiver circuitry to receive, from an eNodeB (eNB), a first indication of a first time division duplex (TDD) uplink/downlink (UL/DL) configuration for a first radio frame; receiving, by the UE, a second indication of a second TDD UL/DL configuration for a second radio frame immediately following the first radio frame; and Hybrid Automatic Repeat reQuest (HARQ) circuitry coupled with the receiver circuitry, the HARQ circuitry to identify, by the UE and based at least in part on the first indication and the second indication, a reference TDD UL/DL configuration for Hybrid Automatic Repeat reQuest (HARQ) timing determination associated with a first subframe in the first radio frame.

Example 36 may include the UE of example 35, wherein the HARQ circuitry is further to identify the reference TDD UL/DL configuration based at least in part on whether a HARQ acknowledgement signal associated with a data received in the first subframe is to be transmitted by the UE in the first radio frame or the second radio frame in accordance with the first TDD UL/DL configuration.

Example 37 may include the UE of examples 35 or 36, wherein the reference TDD UL/DL configuration is the second TDD UL/DL configuration if DL subframes in the first TDD UL/DL configuration of the first radio frame are a subset of DL subframes in the second TDD UL/DL configuration of the second radio frame.

Example 38 may include the UE of examples 35 or 36, wherein the reference TDD UL/DL configuration is the first TDD UL/DL configuration if DL subframes in the first TDD UL/DL configuration of the first radio frame are a superset of DL subframes in the second TDD UL/DL configuration of the second radio frame.

Example 39 may include the UE of examples 35 or 36, wherein the first TDD UL/DL configuration has a first configuration of UL subframes and the second TDD UL/DL configuration has a second configuration of UL subframes; wherein at least a portion of the UL subframes in the first TDD UL/DL are UL subframes in the second TDD UL/DL configuration; and wherein the reference TDD UL/DL configuration is a third TDD UL/DL configuration having a configuration of UL subframes that only includes the portion of UL subframes.

Example 40 may include the UE of example 39, wherein the reference TDD UL/DL configuration is TDD UL/DL configuration 4 if the first TDD UL/DL configuration is TDD UL/DL configuration 3 and the second TDD UL/DL configuration is TDD UL/DL configuration 1; wherein the reference TDD UL/DL configuration is TDD UL/DL configuration 4 if the first TDD UL/DL configuration is TDD UL/DL configuration 1 and the second TDD UL/DL configuration is TDD UL/DL configuration 1; wherein the reference TDD UL/DL configuration is TDD UL/DL configuration 5 if the first TDD UL/DL configuration is TDD UL/DL configuration 3 or TDD UL/DL configuration 4, and the second TDD UL/DL configuration is TDD UL/DL configuration 2; and wherein the reference TDD UL/DL configuration is TDD UL/DL configuration 5 if the first TDD UL/DL configuration is TDD UL/DL configuration 2, and the second TDD UL/DL configuration is TDD UL/DL configuration 3 or TDD UL/DL configuration 4.

Example 41 may include the UE of example 39, wherein the reference TDD UL/DL configuration is TDD UL/DL configuration 0 if the first TDD UL/DL configuration is TDD UL/DL configuration 0; wherein the reference TDD UL/DL configuration is TDD UL/DL configuration 6 if the first TDD UL/DL configuration is TDD UL/DL configuration 6, and the second TDD UL/DL configuration is TDD UL/DL configuration 3; and wherein the reference TDD UL/DL configuration is the TDD UL/DL configuration 3 if the first TDD UL/DL configuration is TDD UL/DL configuration 2, and the second TDD UL/DL configuration is TDD UL/DL configuration 3.

Example 42 may include the UE of example 39, further comprising transmitter circuitry coupled with the receiver circuitry, the transmitter circuitry to transmit a HARQ acknowledgement signal from the UE in accordance with the reference TDD UL/DL configuration.

Example 43 may include the UE of example 42, wherein the transmitter circuitry is further to transmit the HARQ acknowledgement signal on a third generation partnership project (3GPP) physical uplink control channel (PUCCH) or a Physical Uplink Shared Channel (PUSCH).

Example 44 may include a method comprising: receiving, by a user equipment (UE), a first indication of a time division duplex (TDD) uplink/downlink (UL/DL) configuration for a first radio frame; receiving, by the UE from an eNodeB (eNB), a second indication of a second TDD UL/DL configuration for a second radio frame immediately following the first radio frame; identifying, by the UE and based at least in part on the first TDD UL/DL configuration and the second TDD UL/DL configuration, a reference TDD UL/DL configuration for a Hybrid Automatic Repeat reQuest (HARQ) timing in the first radio frame; and transmitting, by the UE, a UL HARQ acknowledgement (HARQ-ACK) message or a physical uplink shared channel (PUSCH) message based at least in part on the reference TDD UL/DL configuration.

Example 45 may include the method of example 44, further comprising receiving, by the UE, a HARQ feedback associated with a PUSCH message in the first radio frame based at least in part on the reference TDD UL/DL configuration.

Example 46 may include the method of examples 44 or 45, wherein the reference TDD UL/DL configuration is equal to the first TDD UL/DL configuration.

Example 47 may include the method of examples 44 or 45, wherein the reference TDD UL/DL configuration is equal to the second TDD UL/DL configuration.

Example 48 may include the method of examples 44 or 45, wherein the reference TDD UL/DL configuration is not equal to the first TDD UL/DL configuration or the second TDD UL/DL configuration.

Example 49 may include the method of examples 44 or 45, wherein the indication is a downlink control information (DCI) message.

Example 50 may include the method of examples 44 or 45, wherein the UL HARQ-ACK message is a message on a third generation partnership project (3GPP) physical uplink shared channel (PUSCH) or a 3GPP physical uplink control channel (PUCCH).

Example 51 may include an apparatus comprising means to perform the method of any of examples 44-50.

Example 52 may include a user equipment (UE) comprising: receiver circuitry to: receive a first indication of a time division duplex (TDD) uplink/downlink (UL/DL) configuration for a first radio frame; and receive, from an eNodeB (eNB), a second indication of a second TDD UL/DL configuration for a second radio frame immediately following the first radio frame; Hybrid Automatic Repeat reQuest (HARQ) circuitry coupled with the receiver circuitry, the HARQ circuitry to identify, based at least in part on the first TDD UL/DL configuration and the second TDD UL/DL configuration, a reference TDD UL/DL configuration for a Hybrid Automatic Repeat reQuest (HARQ) timing in the first radio frame; and transmitter circuitry coupled to the HARQ circuitry, the transmitter circuitry to transmit a UL HARQ acknowledgement (HARQ-ACK) message or a physical uplink shared channel (PUSCH) message based at least in part on the reference TDD UL/DL configuration.

Example 53 may include the UE of example 52, wherein the receiver circuitry is further to receive a HARQ feedback associated with a PUSCH message in the first radio frame based at least in part on the reference TDD UL/DL configuration.

Example 54 may include the UE of examples 52 or 53, wherein the reference TDD UL/DL configuration is equal to the first TDD UL/DL configuration.

Example 55 may include the UE of examples 52 or 53, wherein the reference TDD UL/DL configuration is equal to the second TDD UL/DL configuration.

Example 56 may include the UE of examples 52 or 53, wherein the reference TDD UL/DL configuration is not equal to the first TDD UL/DL configuration or the second TDD UL/DL configuration.

Example 57 may include the UE of examples 52 or 53, wherein the indication is a downlink control information (DCI) message.

Example 58 may include the UE of examples 52 or 53, wherein the UL HARQ-ACK message is a message on a third generation partnership project (3GPP) physical uplink shared channel (PUSCH) or a 3GPP physical uplink control channel (PUCCH).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A user equipment (UE) comprising:
   receiver circuitry to receive, from an eNodeB (eNB), a first indication of a first time division duplex (TDD) uplink/downlink (UL/DL) configuration for a first radio frame and a second indication of a second TDD UL/DL configuration that is same or different than the first TDD UL/DL configuration for a second radio frame that immediately follows the first radio frame; and
   Hybrid Automatic Repeat reQuest (HARQ) circuitry to:
   identify, based at least in part on the first and second indications, a first HARQ timing for a Physical Downlink Shared Channel (PDSCH) or a Physical Uplink Shared Channel (PUSCH) in the first radio frame; and
   identify, based at least in part on the second indication, a second HARQ timing for a PDSCH or a PUSCH in the second radio frame that immediately follows the first radio frame.

2. The UE of claim 1, wherein the first indication or the second indication is a Downlink Control Information (DCI) message.

3. The UE of claim 1, wherein the first indication is received in a first subframe or a first set of subframes of the first radio frame and the second indication is received in a second subframe or a second set of subframes of the second radio frame.

4. The UE of claim 1, wherein the first indication is received in a first subframe or a first set of subframes of a third radio frame that immediately precedes the first radio frame, and the second indication is received in a second subframe or a second set of subframes of the first radio frame.

5. The UE of claim 1, wherein the first indication or the second indication are received in a DL subframe or a set of DL subframes of a TDD UL/DL configuration indicated in a SystemInformationBlockType1 (SIB1) message.

6. The UE of claim 5, wherein the first indication or the second indication are received in subframe 0, subframe 1, subframe 5, or subframe 6 of the TDD UL/DL configuration.

7. A user equipment (UE) comprising:
receiver circuitry to receive, from an eNodeB (eNB), a first indication of a first time division duplex (TDD) uplink/downlink (UL/DL) configuration for a first radio frame and a second indication of a second TDD UL/DL configuration that is same or different than the first TDD UL/DL configuration for a second radio frame that immediately follows the first radio frame; and
Hybrid Automatic Repeat reQuest (HARQ) circuitry to:
identify based at least in t on the first and second indication, a first HARQ timing for a Physical Downlink Shared Channel (PDSCH) or a Physical Uplink Shared Channel (PUSCH) in the first radio frame; and
identify, based at least in part on the second indication, a second HARQ timing a PDSCH or a PUSCH in the second radio frame that immediately follows the first radio frame,
wherein the first indication is received in a first subframe or first set of subframes of the first radio frame or a second subframe or a second set of subframes of a third radio frame immediately preceding the first radio frame, and the second indication is received in a third subframe or third set of subframes of the first radio frame or a fourth subframe or fourth set of subframes of the second radio frame.

8. A method comprising:
receiving, by a user equipment (UE) from an eNodeB (eNB), a first indication of a first time division duplex (TDD) uplink/downlink (UL/DL) configuration for a first radio frame;
receiving, by the UE, a second indication of a second TDD UL/DL configuration for a second radio frame immediately following the first radio frame; and
identifying, by the UE and based at least in part on the first indication and the second indication, a reference TDD UL/DL configuration for Hybrid Automatic Repeat reQuest (HARQ) timing determination associated with a first subframe in the first radio frame.

9. The method of claim 8, further comprising identifying, by the UE, the reference TDD UL/DL configuration based at least in part on whether a HARQ acknowledgement signal associated with a data received in the first subframe is to be transmitted by the UE in the first radio frame or the second radio frame in accordance with the first TDD UL/DL configuration.

10. The method of claim 8, wherein the reference TDD UL/DL configuration is the second TDD UL/DL configuration if DL subframes in the first TDD UL/DL configuration of the first radio frame are a subset of DL subframes in the second TDD UL/DL configuration of the second radio frame.

11. The method of claim 8, wherein the reference TDD UL/DL configuration is the first TDD UL/DL configuration if DL subframes in the first TDD UL/DL configuration of the first radio frame are a superset of DL subframes in the second TDD UL/DL configuration of the second radio frame.

12. The method of claim 8, wherein the first TDD UL/DL configuration has a first configuration of UL subframes and the second TDD UL/DL configuration has a second configuration of UL subframes;
wherein at least a portion of the UL subframes in the first TDD UL/DL are UL subframes in the second TDD UL/DL configuration; and
wherein the reference TDD UL/DL configuration is a third TDD UL/DL configuration having a configuration of UL subframes that only includes the portion of UL subframes.

13. The method of claim 12, wherein the reference TDD UL/DL configuration is TDD UL/DL configuration 4 if the first TDD UL/DL configuration is TDD UL/DL configuration 3 and the second TDD UL/DL configuration is TDD UL/DL configuration 1;
wherein the reference TDD UL/DL configuration is TDD UL/DL configuration 4 if the first TDD UL/DL configuration is TDD UL/DL configuration 1 and the second TDD UL/DL configuration is TDD UL/DL configuration 1;
wherein the reference TDD UL/DL configuration is TDD UL/DL configuration 5 if the first TDD UL/DL configuration is TDD UL/DL configuration 3 or TDD UL/DL configuration 4, and the second TDD UL/DL configuration is TDD UL/DL configuration 2; and
wherein the reference TDD UL/DL configuration is TDD UL/DL configuration 5 if the first TDD UL/DL configuration is TDD UL/DL configuration 2, and the second TDD UL/DL configuration is TDD UL/DL configuration 3 or TDD UL/DL configuration 4.

14. The method of claim 12, wherein the reference TDD UL/DL configuration is TDD UL/DL configuration 0 if the first TDD UL/DL configuration is TDD UL/DL configuration 0;
wherein the reference TDD UL/DL configuration is TDD UL/DL configuration 6 if the first TDD UL/DL configuration is TDD UL/DL configuration 6, and the second TDD UL/DL configuration is TDD UL/DL configuration 3; and
wherein the reference TDD UL/DL configuration is the TDD UL/DL configuration 3 if the first TDD UL/DL configuration is TDD UL/DL configuration 2, and the second TDD UL/DL configuration is TDD UL/DL configuration 3.

15. The method of claim 12, further comprising transmitting, by the UE, a HARQ acknowledgement signal from the UE in accordance with the reference TDD UL/DL configuration.

16. The method of claim 15, further comprising transmitting, by the UE, the HARQ acknowledgement signal on a third generation partnership project (3GPP) physical uplink control channel (PUCCH) or a Physical Uplink Shared Channel (PUSCH).

17. One or more non-transitory computer readable storage media comprising instructions to cause a user equipment (UE), upon execution of the instructions by a processor of the UE, to:
receive a first indication of a time division duplex (TDD) uplink/downlink (UL/DL) configuration for a first radio frame;

receive, from an eNodeB (eNB), a second indication of a second TDD UL/DL configuration for a second radio frame immediately following the first radio frame;

identify, by the UE and based at least in part on the first TDD UL/DL configuration and the second TDD UL/DL configuration, a reference TDD UL/DL configuration for a Hybrid Automatic Repeat reQuest (HARQ) timing in the first radio frame; and transmit, by the UE, a UL HARQ acknowledgement (HARQ-ACK) message or a physical uplink shared channel (PUSCH) message based at least in part on the reference TDD UL/DL configuration.

18. The one or more computer readable storage media of claim 17, wherein the instructions further include instructions to receive a HARQ feedback associated with a PUSCH message in the first radio frame based at least in part on the reference TDD UL/DL configuration.

19. The one or more computer readable storage media of claim 17, wherein the reference TDD UL/DL configuration is equal to the first TDD UL/DL configuration.

20. The one or more computer readable storage media of claim 17, wherein the reference TDD UL/DL configuration is equal to the second TDD UL/DL configuration.

21. The one or more computer readable storage media of claim 17, wherein the reference TDD UL/DL configuration is not equal to the first TDD UL/DL configuration or the second TDD UL/DL configuration.

22. The one or more computer readable storage media of claim 17, wherein the indication is a downlink control information (DCI) message.

23. The one or more computer readable storage media of claim 17, wherein the UL HARQ-ACK message is a message on a third generation partnership project (3GPP) physical uplink shared channel (PUSCH) or a 3GPP physical uplink control channel (PUCCH).

* * * * *